(12) United States Patent
Rodriguez et al.

(10) Patent No.: US 7,428,652 B2
(45) Date of Patent: Sep. 23, 2008

(54) PROGRAMMABLE PHASE GENERATOR FOR CROSS-CLOCK COMMUNICATION WHERE THE CLOCK FREQUENCY RATIO IS A RATIONAL NUMBER

(75) Inventors: Jose M. Rodriguez, San Jose, CA (US); Kok Lim Patrick Lee, Penang (MY); Soon Chieh Lim, Penang (MY)

(73) Assignee: Intel Corporation, Santa Clara, CA (US)

( * ) Notice: Subject to any disclaimer, the term of this patent is extended or adjusted under 35 U.S.C. 154(b) by 462 days.

(21) Appl. No.: 11/125,699

(22) Filed: May 10, 2005

(65) Prior Publication Data
US 2006/0259805 A1    Nov. 16, 2006

(51) Int. Cl.
*G06F 1/12* (2006.01)
*G06F 1/04* (2006.01)
*G06F 15/16* (2006.01)
*G06F 5/06* (2006.01)

(52) U.S. Cl. ............... 713/400; 713/375; 713/600
(58) Field of Classification Search ............. 713/375, 713/400, 600
See application file for complete search history.

(56) References Cited

U.S. PATENT DOCUMENTS

| | | | | |
|---|---|---|---|---|
| 4,405,898 A * | 9/1983 | Flemming | ............ | 327/145 |
| 5,459,855 A * | 10/1995 | Lelm | ............ | 713/400 |
| 5,487,092 A * | 1/1996 | Finney et al. | ............ | 375/354 |
| 5,588,004 A | 12/1996 | Suzuki et al. | | |
| 5,796,995 A * | 8/1998 | Nasserbakht et al. | ...... | 713/503 |
| 5,826,067 A * | 10/1998 | Fisch et al. | ............ | 713/503 |
| 5,834,956 A * | 11/1998 | Pathikonda et al. | ...... | 327/116 |
| 5,862,373 A * | 1/1999 | Pathikonda et al. | ...... | 713/501 |
| 6,104,219 A * | 8/2000 | Barkatullah et al. | ...... | 327/116 |
| 6,112,307 A * | 8/2000 | Ajanovic et al. | ......... | 713/400 |
| 6,114,887 A * | 9/2000 | Pathikonda et al. | ...... | 327/154 |
| 6,172,540 B1 * | 1/2001 | Gandhi | ............ | 327/145 |
| 6,208,180 B1 * | 3/2001 | Fisch et al. | ............ | 327/141 |
| 6,268,749 B1 * | 7/2001 | Fisch et al. | ............ | 327/147 |

(Continued)

FOREIGN PATENT DOCUMENTS

EP    0 735 494 A1    10/1996

OTHER PUBLICATIONS

PCT/US2006/017049, PCT International Search Report and Written Opinion of the International Searching Authority, Nov. 22, 2006.

*Primary Examiner*—Mark Connolly
*Assistant Examiner*—Jaweed A Abbaszadeh
(74) *Attorney, Agent, or Firm*—Blakely, Sokoloff, Taylor & Zafman LLP (57) ABSTRACT

A method and apparatus to support communication between components in different clock domains having a rational clock frequency ratio of N/D. In one embodiment, a combination of integer phase generators are employed to produce phase control signals during an overall cycle having N phases, wherein the overall cycle is a combination of primary cycles having D phases and an adjustment cycle having R phases, wherein R is the remainder of N/D. For clock frequency ratios of less than 2:1, a combination of 2:1 and 1:1 phase generators are employed. Clocking signals are generated by phase generator logic to provide timing control between communicating components in the different clock domains. In one embodiment, the phase generator logic is implemented in a programmable phase generator.

18 Claims, 8 Drawing Sheets

U.S. PATENT DOCUMENTS

| | | | |
|---|---|---|---|
| 6,633,994 B1 * | 10/2003 | Hofmann et al. | 713/600 |
| 6,738,917 B2 * | 5/2004 | Hummel et al. | 713/400 |
| 6,898,725 B2 * | 5/2005 | Kark et al. | 713/502 |
| 6,928,574 B1 * | 8/2005 | Radjassamy | 713/501 |
| 6,931,562 B1 * | 8/2005 | Radjassamy | 713/501 |
| 7,047,433 B2 * | 5/2006 | Lin | 713/400 |
| 7,134,035 B2 * | 11/2006 | Sharma et al. | 713/500 |
| 7,219,251 B2 * | 5/2007 | Adkisson | 713/400 |
| 7,245,684 B2 * | 7/2007 | Adkisson | 375/359 |
| 7,249,274 B1 * | 7/2007 | McGinnis | 713/400 |
| 7,269,754 B2 * | 9/2007 | Ramaswamy et al. | 713/401 |
| 2002/0087909 A1 * | 7/2002 | Hummel et al. | 713/400 |
| 2003/0002606 A1 | 1/2003 | Chen et al. | |
| 2003/0141908 A1 * | 7/2003 | Stong | 327/141 |
| 2004/0193936 A1 * | 9/2004 | Kelly | 713/500 |
| 2004/0243869 A1 * | 12/2004 | Sharma et al. | 713/400 |

* cited by examiner

PROGRAMMABLE PHASE GENERATOR FOR CROSS-CLOCK COMMUNICATION WHERE THE CLOCK FREQUENCY RATIO IS A RATIONAL NUMBER

FIELD OF THE INVENTION

The field of invention relates generally to computer and telecommunications networks and, more specifically but not exclusively relates to a clocking scheme under which the ratio between clock frequencies for communicating components may be a rational number.

BACKGROUND INFORMATION

Network devices, such as switches and routers, are designed to forward network traffic, in the form of packets, at high line rates. One of the most important considerations for handling network traffic is packet throughput. To accomplish this, special-purpose processors known as network processors have been developed to efficiently process very large numbers of packets per second. In order to process a packet, the network processor (and/or network equipment employing the network processor) needs to extract data from the packet header indicating the destination of the packet, class of service, etc., store the payload data in memory, perform packet classification and queuing operations, determine the next hop for the packet, select an appropriate network port via which to forward the packet, etc. These operations are generally referred to as "packet processing" operations.

Modern network processors (also commonly referred to as network processor units (NPUs)) perform packet processing using multiple multi-threaded processing elements (e.g., processing cores) (referred to as microengines or compute engines in network processors manufactured by Intel® Corporation, Santa Clara, Calif.), wherein each thread performs a specific task or set of tasks in a pipelined architecture. During packet processing, numerous accesses are performed to move data between various shared resources coupled to and/or provided by a network processor. For example, network processors commonly store packet metadata and the like in static random access memory (SRAM) stores, while storing packets (or packet payload data) in dynamic random access memory (DRAM)-based stores. In addition, a network processor may be coupled to cryptographic processors, hash units, general-purpose processors, and expansion buses, such as the PCI (peripheral component interconnect) and PCI Express bus.

Network processors are often configured to perform processing in a collaborative manner, such as via a pipelined processing scheme. Typically, different threads perform different portions of the same task or related tasks, with the output of one thread being employed as an input to the next thread. The threads are specifically tailored for a particular task or set of tasks, such as packet forwarding, packet classification, etc. This type of scheme enables packet-processing operations to be carried out at line rates for most packets, also referred to as "fast path" operations. However, some packets present problems that require additional processing. Under one approach, packet processing for these packets is performed by using "slow path" operations performed by a general-purpose processor or the like, wherein a redirection event causes packet processing to switch from the multi-threaded processing elements to the general purpose processor. The general-purpose processor typically provides a larger instruction set than the multi-threaded processing elements, supporting execution of more flexible and complex tasks that are designed to handle such "problem" packets.

In many instances, the architectures employed by the multi-threaded processing elements and the general-purpose processor are significantly different. For instance, the microengines on many Intel® NPUs employ RISC (reduced instruction set computer) architectures, while the general-purpose processor employs a CISC (complex instruction set computer architecture). Furthermore, the operating speeds of the different types of processing elements are usually different.

Hand-offs from fast-path to slow-path processing require communication between the microengines and the general-purpose processor. Furthermore, both the microengines and the general-purpose processor need to access packet data stored in memory, which may be accessed via a memory or system bus running at yet another frequency. As such, it is necessary to have some type of clocking scheme that enables processing elements and buses running at different clock frequencies to communicate with each other. Heretofore, this has been done by having the clock frequency of one type of processing element (e.g., the micro-engines) be an integer multiple of the clock frequency of another type of processing element (e.g., the general-purpose processor) or bus.

While this supports communication between the processing elements and system resources such as memory, it limits the design flexibility of the overall NPU architecture. For example, it may be advantageous to increase the frequency of one type of processing element while leaving the frequency of another type or bus alone, or otherwise employing an architecture under which the ratios between the clock domains is a rational number rather than limited to an integer ratio.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus to support cross-clock communication between clock domains having a frequency ratio that is a rational number are disclosed herein. In the following description, numerous specific details are set forth, such as implementations using Intel's® NPUs, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments disclosed herein, techniques are provided to support communication between components, such as processing elements and memory or system busses, operating in different clock domains, wherein the clock frequency ratios of the clock domains are rational numbers. While the following examples pertain to NPU architecture implementations in particular, the general principles and teachings of the techniques may be employed in other architectures and systems as well.

As an overview, one technique for supporting cross-clock communication across clock domains having an integer clock frequency ratio will first be discussed. Extensions of this scheme to support clock frequency ratios that are rational numbers will then be presented.

Under the embodiments described herein, clock phase generation logic is used to create phase signals to enable communication between components in different clock domains. The term "clock domain" refers to a set or group of one or more components running at the same clock frequency. The set of components in a clock domain are sometimes referred to as a "block," such that communication between components in different clock domains may be described as communication between blocks. The phase generator logic is performed by a unit referred to as the "gasket" unit. A typical application of this phase generator logic in an Intel® NPU is to provide synchronization on the handshaking signals crossing between a general-purpose processor and a memory controller/system bus, which is part of the internal interconnect in the NPU. The principles and teachings herein may also be applied to other cross-clock communication environments, such as between two processing elements running at different clock rates.

Figure 1:
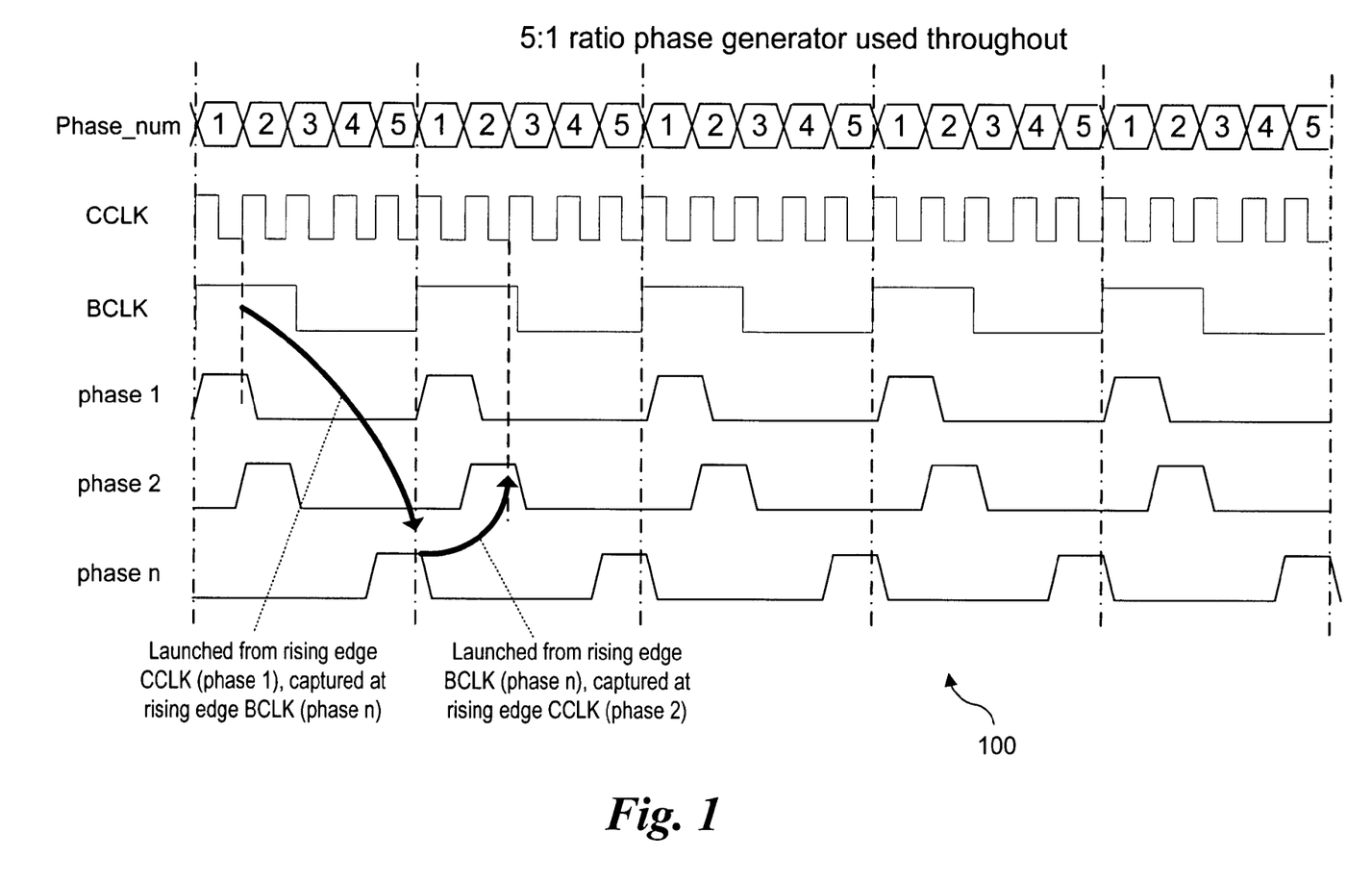
FIG. 1 shows a timing diagram corresponding to a cross-clock communication scheme that enables components in two different clock domains to communicate with each other, wherein the clock frequency ratio of the clock domains is 5:1.

FIG. 1 depicts a timing diagram 100 corresponding to an exemplary cross-clock communication timing scheme that enables components under respective clock domains to communicate with each other. In this example, the ratio of the clock domains is 5:1, that is, the clock frequency of one clock domain is five times the clock frequency for the other domain. For the examples illustrated herein, the clock signal for the high frequency clock domain is depicted as a core clock (CCLK) signal, while the clock signal for the low frequency clock domain is depicted as a BCLK signal. The gasket unit also runs at the lower BCLK signal clock speed. In one embodiment of the foregoing communication timing scheme, a general-purpose processor employing the Xscale® architecture and running at a clock frequency of 667 MHz (e.g., CCLK=667 MHz) is interfaced to a memory controller/system bus, running at a clock speed of 133 MHz (e.g., BCLK=133 MHz).

As illustrated in timing diagram 100, the communication scheme employs a basic timing cycle having 5 phases. In addition to the CCLK and BCLK signals, the scheme employs a phase 1 control signal, a phase 2 control signal, and a phase n control signal, each of which is activated (e.g., asserted logic level high) during a respective phase for each basic timing cycle. Meanwhile, during a given basic timing cycle, the CCLK signal undergoes five cycles, while the BCLK signal undergoes a single cycle.

One advantage of the clocking scheme of FIG. 1 is that all handshaking signals issued by the processor (CCLK) going to the gasket unit (BCLK) are launched during phase 1 (rising edge of CCLK), and captured by the gasket at phase-n (rising edge of BCLK). On the other hand, all handshaking signals issued by the gasket unit going to the processor are launched at phase-n (rising edge of the BCLK), and captured by processor at phase 2 (rising edge of CCLK). This makes the design very robust by providing a minimum of two core clock (CCLK) periods worth of setup time for any handshaking traveling between the two blocks. Moreover, by not clocking any signals on the rising edge of phase 1, any concerns regarding clock skew between a rising edge of the BCLK signal and a rising edge of the CCLK are eliminated.

The foregoing clock phase generation logic works fine as long as an integer ratio of CCLK to BCLK is specified (e.g. 5:1 in FIG. 1). Embodiments of the invention support the use of phase control logic when the ratio between CCLK and BCLK is a rational number instead of an integer. For example, under one implementation the processor clock speed CCLK=640 MHz, while the memory/system bus clock speed BCLK is maintained as 133 MHZ. The ratio of the clock period in this case would be (CCLK:BCLK=24:5), where the BCLK and CCLK edges aligns every 24 CCLK cycles.

To support a timing ratio of 24:5, one embodiment employs a group of 5+5+5+5+4 CCLK cycles. This means that during the first 20 CCLK cycles, the 5:1 ratio phase generator scheme of FIG. 1 is employed. At the end of the 20$^{th}$ CCLK cycle, the 4:1 ratio phase generator is used for the last four CCLK cycles. A corresponding timing diagram 200 is shown in FIG. 2.

Figure 2:
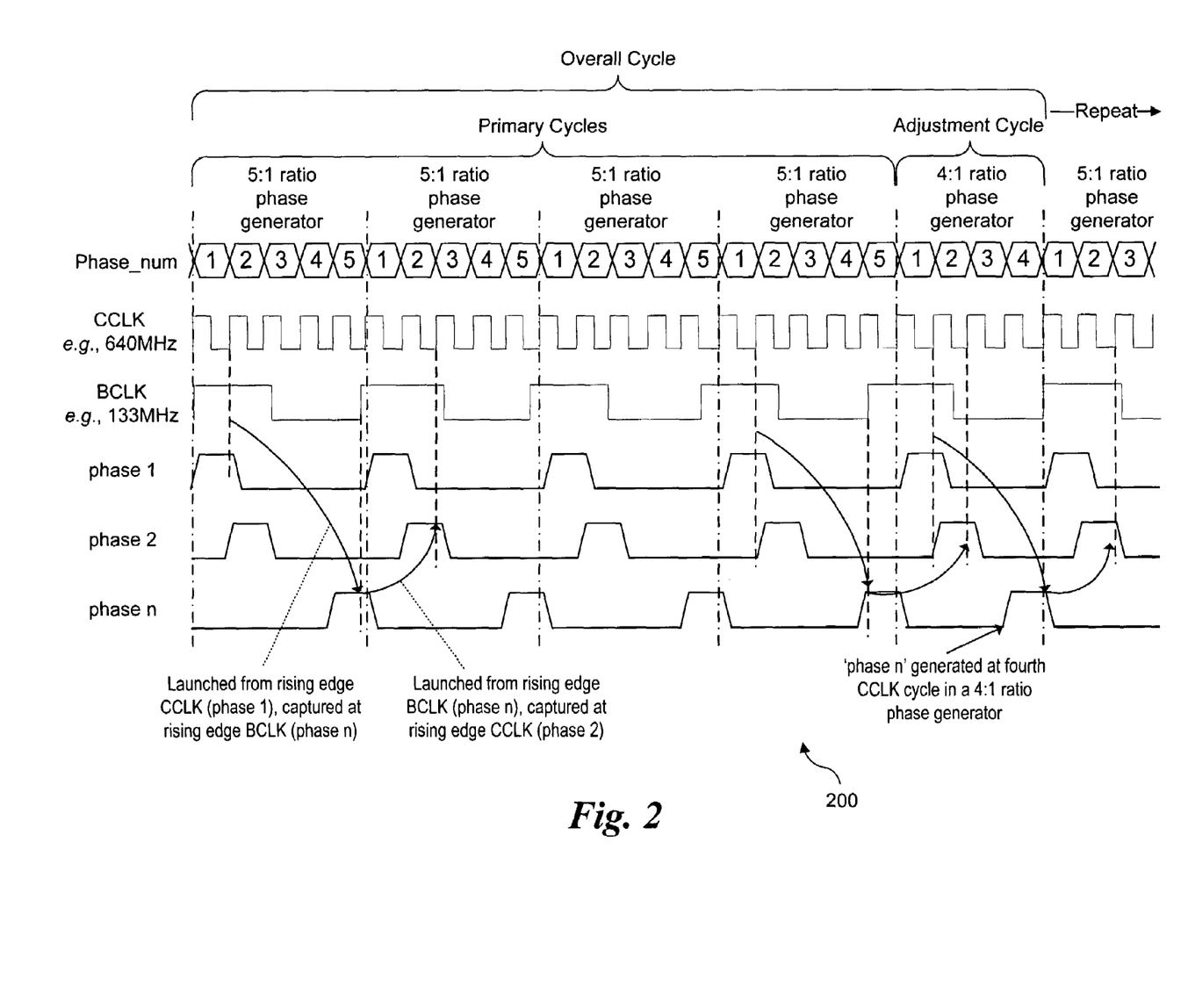
FIG. 2 shows a timing diagram corresponding to an one embodiment of the invention that supports cross-clock communication between components in clock domains having a clock frequency ratio that is a rational number, wherein the ratio is 24:5.

As illustrated in FIG. 2, the 4:1 ratio phase generator is used during CCLK cycle-21 to cycle-24. The phase-1, phase-2 and phase-n signals are used as enable signals to gate the launching and capturing of the cross-clock handshaking signals from CCLK to BCLK and vice versa. The idea is to make sure the launching and capturing clock edges fall within the duration when the phase control signals are asserted. The phase control signals are generated with respect to the core clock (CCLK) signal.

In general, the timing scheme illustrated in FIG. 2 may be implemented to support communication between various clock domains having a frequency ratio N/D that is a rational number greater than 2:1. Under one embodiment, the number of phases for each of the number of more common cycles, referred to as primary cycles, is set equal to the denominator D, while the total number of phases for an overall timing sequence cycle (e.g., all the phases that are performed during a overall cycle that is repeated on an ongoing basis) is set equal to the numerator N. Under one approach, one "adjustment" cycle having a number of phases equal to the remainder R of the frequency ratio N/D is employed to obtain a total number of phases for the overall timing sequence that is equal to the numerator. The primary cycles of the overall timing sequence can be implemented using an D:1 ratio phase generator, while the adjustment cycle employs an R:1 ratio phase generator, wherein R is equal to the number of phases in the adjustment cycle.

For example, under the timing scheme of FIG. 2, the CCLK:BCLK ratio is 24:5, and thus the numerator N is 24, the denominator D is 5, and the remainder R is 4. Accordingly, four primary cycles having 5 (D) phases are implemented in sequence using a 5:1 ratio phase generator, followed by a single adjustment cycle having 4 (R) phases (implemented by a 4:1 ratio phase generator), such that the total number of phases for the overall cycle is 24 (N).

Figure 3:
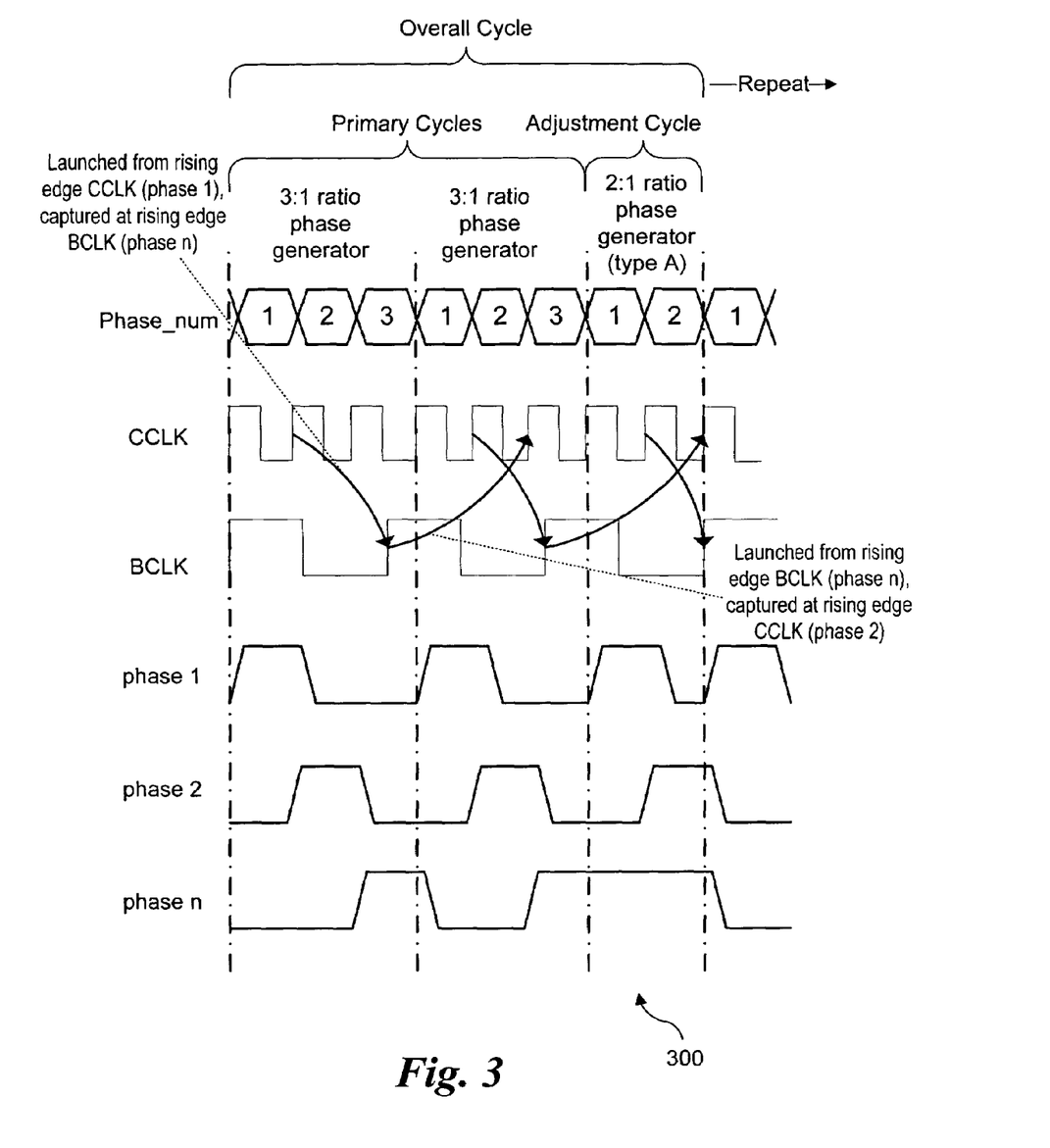
FIG. 3 shows a timing diagram corresponding to an implementation of the cross-clock communication scheme for clock domains having a ratio of 8:3.

Under another example, the clock domain ratio is 8:3 (e.g., 266 MHz/100 MHz), as illustrated by a timing diagram 300 in FIG. 3. The total number of phases for the overall cycle is 8, and the primary cycle length is 3 phases. Accordingly, the timing sequence consists of 3+3+2 phases, which can be implemented using a 3:1 ratio phase generator for the primary cycles and a 2:1 ratio phase generator for the adjustment cycle. Again, the idea is to make sure that the rising edge of the slower clock, BCLK, occurs when phase-n is asserted. This will then allow more than one CCLK cycles for setup time between the two clock domains.

Embodiments of the cross-clock communication scheme may also be employed for clock frequency ratios of less than 2:1. Under one embodiment, a combination of 2:1 ratio phase generators and 1:1 ratio phase generators are employed to obtain the correct ratio. In essence, the 1:1 phase generator asserts a static high logic level for all control signals. Two types of 2:1 phase generators may be used, which are referred to herein as "type A" and "type B." The difference between these two types of 2:1 phase generators lies in how the phase-1 and phase-2 control signals are generated.

Figure 4A:
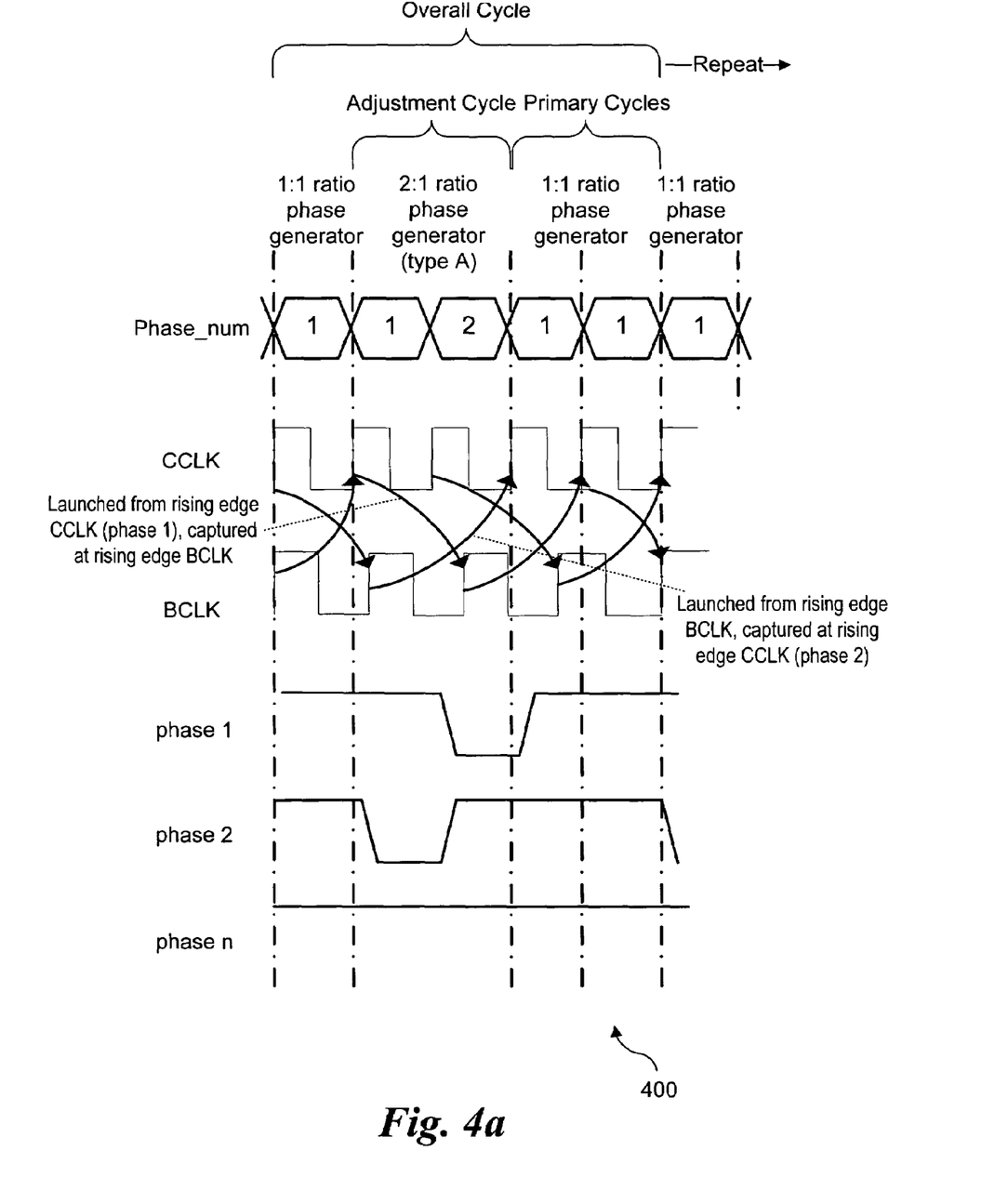
FIG. 4*a* shows a timing diagram corresponding to a first implementation of a cross-clock communication scheme that supports rational clock frequency ratios of less than 2:1, wherein a 1:1 phase generator is used for primary cycles, and a 2:1 phase generator is used for an adjustment cycle.

In further detail, an implementation of a type A 2:1 phase generator is shown in a timing diagram 400 shown in FIG. 4a. (It is noted that a type A 2:1 phase generator is also employed in the embodiment of FIG. 3.) This timing diagram corresponds to a CCLK to BCLK ratio of 5:4. Under the 1:1 ratio phase generator, each of the phase 1, phase 2, and phase n control signals is asserted high. Furthermore, the phase n control signal is asserted high through all phases. Under the type A 2:1 phase generator, all control signals issued by the gasket unit going to the processor are launched from the rising edge of the BCLK, and captured by processor at the rising edge of the next CCLK signal when phase 2 is asserted. In general, a type A 2:1 phase generator will be employed when the adjustment cycle has a length of two phases.

Figure 4B:
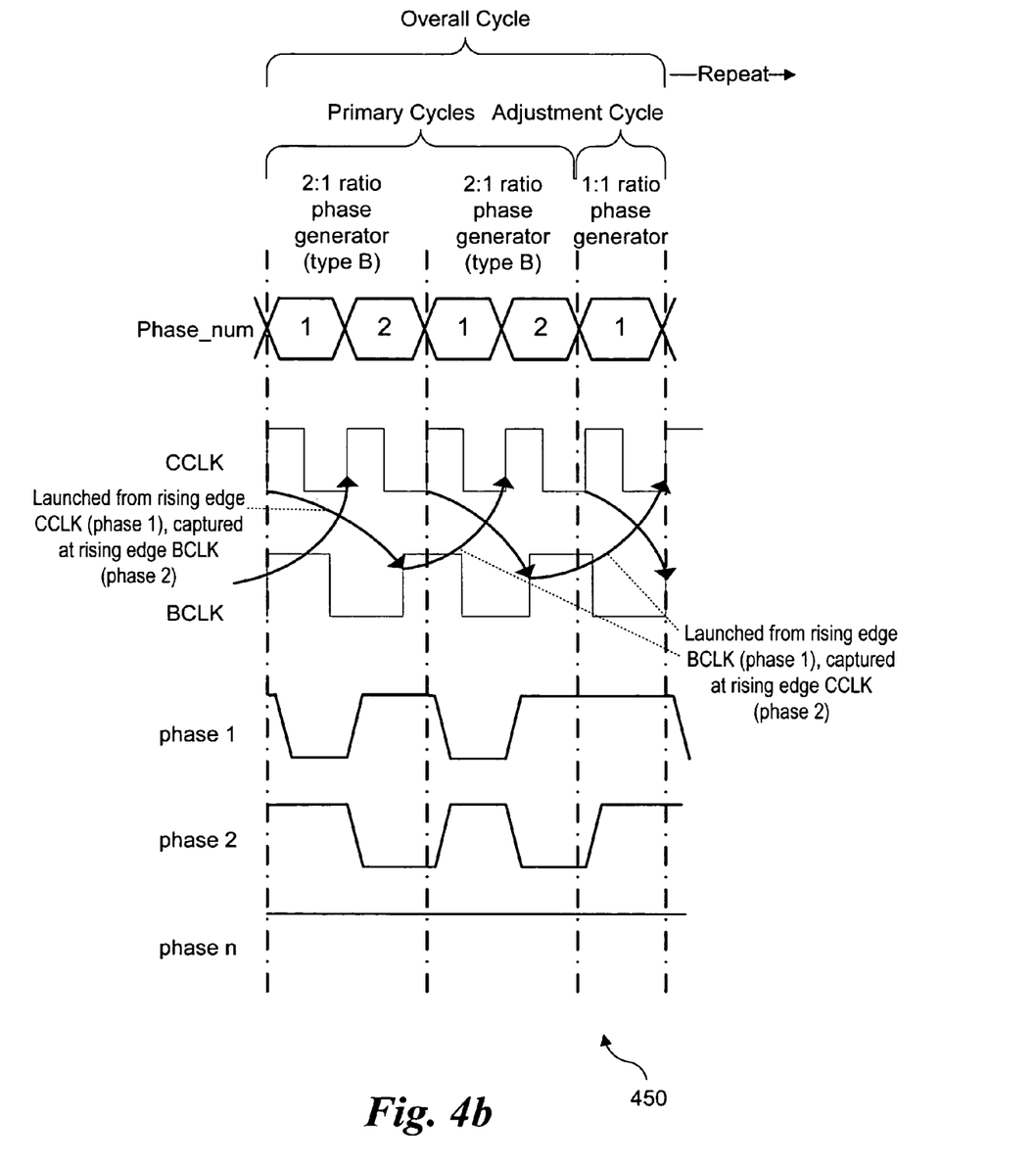
FIG. 4*b* shows a timing diagram corresponding to an alternative implementation of the cross-clock communication scheme of FIG. 4*a*, wherein a 2:1 phase generator is used for primary cycles, and a 1:1 phase generator is used for an adjustment cycle.

FIG. 4b shows a timing diagram 450 that employs a type B 2:1 phase generator. Under the type B 2:1 phase generator, the BCLK signal is launched by the processor from the rising edge of the CCLK and captured by gasket unit at the rising edge of the next CCLK signal when phase 1 is asserted. Meanwhile, the CCLK signal is launched from the rising edge of the BCLK when phase 2 is asserted and captured by the processor at the rising edge of the next CCLK signal when phase 2 is asserted. In general, a type B 2:1 phase generator will be employed when the primary cycle has a length of two phases.

Figure 5:
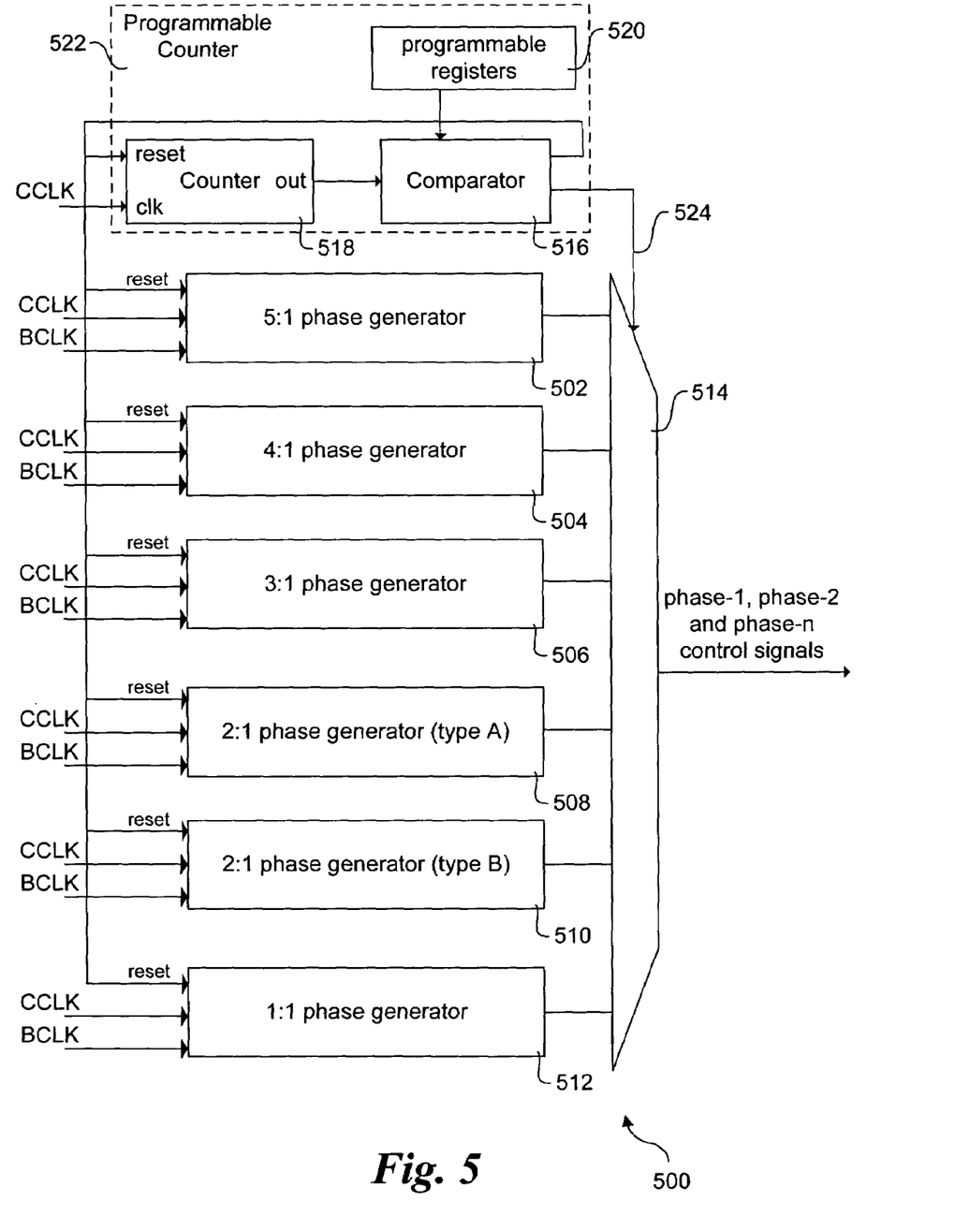
FIG. 5 is a schematic diagram of one embodiment of a programmable phase generator that may be used to generate control signals corresponding to each of the embodiments depicted in FIGS. 2, 3, 4*a*, and 4*b;*

One embodiment of a programmable phase generator 500 for generating the aforementioned control signals is shown in FIG. 5. The programmable phase generator includes a number of integer phase generators having outputs selected via a multiplexer. In the illustrated embodiment, programmable phase generator 500 includes a 5:1 phase generator 502, a 4:1 phase generator 504, a 3:1 phase generator 506, a type A 2:1 phase generator 508, a type B 2:1 phase generator 510, and a 1:1 phase generator 512. The outputs of each of these phase generators is fed into a multiplexer 514 having a control input coupled to the output of a comparator 516. Programmable phase generator 500 further includes a counter 518 and programmable registers 520. The combination of counter 518, comparator 516, and programmable registers 520 form a programmable counter 522.

The operation of programmable phase generator 500 is as follows. First, a user will program the desired ratio into programmable registers 520. For example, for the ratio of 24:5, the user will program 20 and 4 into appropriate registers in programmable registers 520. The counter 518, which is clocked by the core clock (CCLK), starts to count from 0 after it is reset by comparator 516. While the count is less than 20, the 5:1 phase generator 502 is selected by comparator 516 by providing an appropriate multiplexer select signal 524 to multiplexer 514. When the count reaches 20, the comparator selects the 4:1 phase generator 504, and also resets counter 518, as well as each of phase generators 502, 504, 506, 508, 510 and 512. Again, the counter starts counting from 0 and is incremented by one with each cycle of the CCLK signal. The comparator toggles multiplexer select signal 524 to select the 5:1 phase generator 502 when the count reaches 4. The entire process is then repeated on an ongoing basis.

In general, the ratios for the phase generators employed by programmable phase generator 500 are merely illustrative of a set of phase generator ratios that might be used in an actual implementation. In other embodiments, a different combination of phase generator ratios may be employed, including phase generators with ratios greater than 5:1. The particular combination of phase generator ratios will typically depend on the architecture constraints applicable to an integrated circuit or system environment in which the programmable phase generator is employed.

Figure 6:
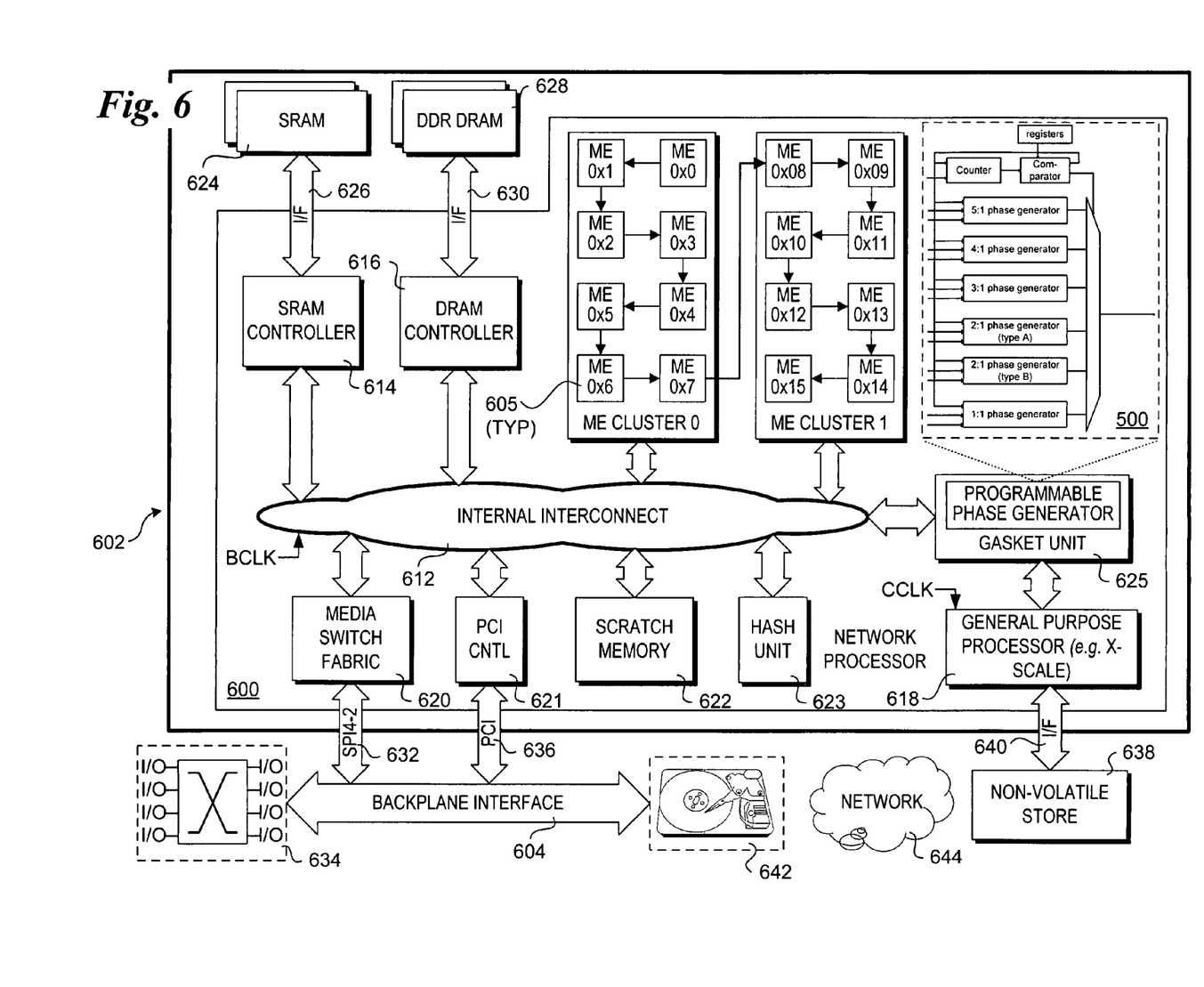
FIG. 6 is a schematic diagram of a network line card employing a network processor including a gasket unit that employs the programmable phase generator of FIG. 5.

FIG. 6 shows an exemplary implementation of a network processor 600 that is configured to implement cross-clock communication via use of programmable phase generator 500. In this implementation, network processor 600 is employed in a line card 602. In general, line card 602 is illustrative of various types of network element line cards employing standardized or proprietary architectures. For example, a typical line card of this type may comprises an Advanced Telecommunications and Computer Architecture (ATCA) modular board that is coupled to a common backplane in an ATCA chassis that may further include other ATCA modular boards. Accordingly the line card includes a set of connectors to meet with mating connectors on the backplane, as illustrated by a backplane interface 604. In general, backplane interface 604 supports various input/output (I/O) communication channels, as well as provides power to line card 602. For simplicity, only selected I/O interfaces are shown in FIG. 6, although it will be understood that other I/O and power input interfaces also exist.

Network processor 600 includes n microengines 605. In one embodiment, n=8, while in other embodiment n=16, 24, or 32. Other numbers of microengines 605 may also me used. In the illustrated embodiment, 16 microengines 605 are shown grouped into two clusters of 8 microengines, including an ME cluster 0 and an ME cluster 1.

Each of microengines 600 is connected to other network processor components via sets of bus and control lines referred to as the processor "chassis". For clarity and simplicity, these bus sets and control lines are depicted as an internal interconnect 612. Also connected to the internal interconnect are an SRAM controller 614, a DRAM controller 616, a general purpose processor 618, a media switch fabric interface controller 620, a PCI (peripheral component interconnect) controller 621, scratch memory 622, and a hash unit 623. Other components not shown that may be provided by network processor 600 include, but are not limited to, encryption units, a CAP (Control Status Register Access Proxy) unit, and a performance monitor.

The SRAM controller 614 is used to access an external SRAM store 624 via an SRAM interface 626. Similarly, DRAM controller 616 is used to access an external DRAM store 628 via a DRAM interface 630. In one embodiment, DRAM store 628 employs DDR (double data rate) DRAM. In other embodiment DRAM store may employ Rambus DRAM (RDRAM) or reduced-latency DRAM (RLDRAM).

General-purpose processor 618 may be employed for various network processor operations. In one embodiment, slow path packet processing operations are facilitated by software executing on general-purpose processor 618, while fast path operations are primarily facilitated by instruction threads executing on microengines 605.

Media switch fabric interface controller 620 is used to interface with the media switch fabric for the network element in which the line card is installed. In one embodiment, media switch fabric interface controller 620 employs a System Packet Level Interface 4 Phase 2 (SPI4-2) interface 632. In general, the actual switch fabric may be hosted by one or more separate line cards, or may be built into the chassis backplane. Both of these configurations are illustrated by switch fabric 634.

PCI controller 622 enables the network processor to interface with one or more PCI devices that are coupled to backplane interface 604 via a PCI interface 636. In one embodiment, PCI interface 636 comprises a PCI Express interface.

General-purpose processor 618 and internal interconnect 612 represent two clock domains having a ratio that is a rational number. Accordingly, a gasket unit 625 including programmable phase generator 500 is coupled between general purpose processor 618 and internal interconnect 612 to provide appropriate timing control signals between the clock signals of the two clock domains.

During initialization, coded instructions (e.g., microcode) to facilitate various packet-processing functions and operations are loaded into control stores for microengines 605. In one embodiment, the instructions are loaded from a non-volatile store 638 hosted by line card 602, such as a flash memory device. Other examples of non-volatile stores include read-only memories (ROMs), programmable ROMs (PROMs), and electronically erasable PROMs (EEPROMs). In one embodiment, non-volatile store 638 is accessed by general-purpose processor 618 via an interface 640. In another embodiment, non-volatile store 638 may be accessed via an interface (not shown) coupled to internal interconnect 612.

In addition to loading the instructions from a local (to line card 602) store, instructions may be loaded from an external source. For example, in one embodiment, the instructions are stored on a disk drive 642 hosted by another line card (not shown) or otherwise provided by the network element in which line card 602 is installed. In yet another embodiment, the instructions are downloaded from a remote server or the like via a network 644 as a carrier wave.

In one embodiment, general-purpose processor 618 runs software to enable a user to program program registers 520 with appropriate data to cause programmable phase generator 500 to generate control signals in accordance with the clock ratios of the two clock domains (e.g., CCLK:BCLK). In another embodiment, the register values are hard-coded on network processor 600.

Figure 7:
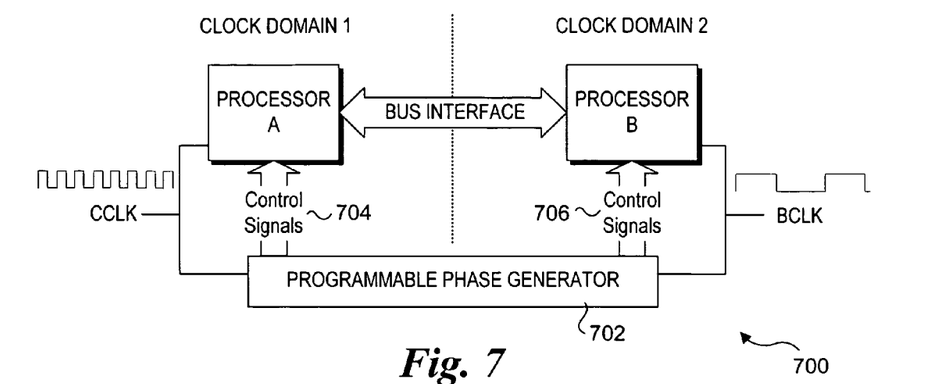
FIG. 7 is a schematic diagram of a cross-clock domain environment in which processors running at different clock frequencies forming a rational ratio are enabled to communicate with each other via control signals provided by a programmable phase generator.

FIG. 7 shows an exemplary cross-clock domain environment 700 under which communication between a pair of processors running at respective clock frequencies having a rational number ratio. In environment 700, Processor A is operating in a clock domain 1 that employs a CCLK clock signal, while Processor B is operating in a clock domain 2 that employs a BCLK signal. A programmable phase generator 700 receives both the CCLK and BCLK signals are inputs, and generates control signals 704 and 706, which provide timing signals for passing address and data between processors A and B across a bus interface 708. In essence, control signals 704 and 706 are similar to the aforementioned handshaking signals, except that are referred to a control signals here because they are actually not passed between the two communication components (e.g., processors A and B).

Figure 8:
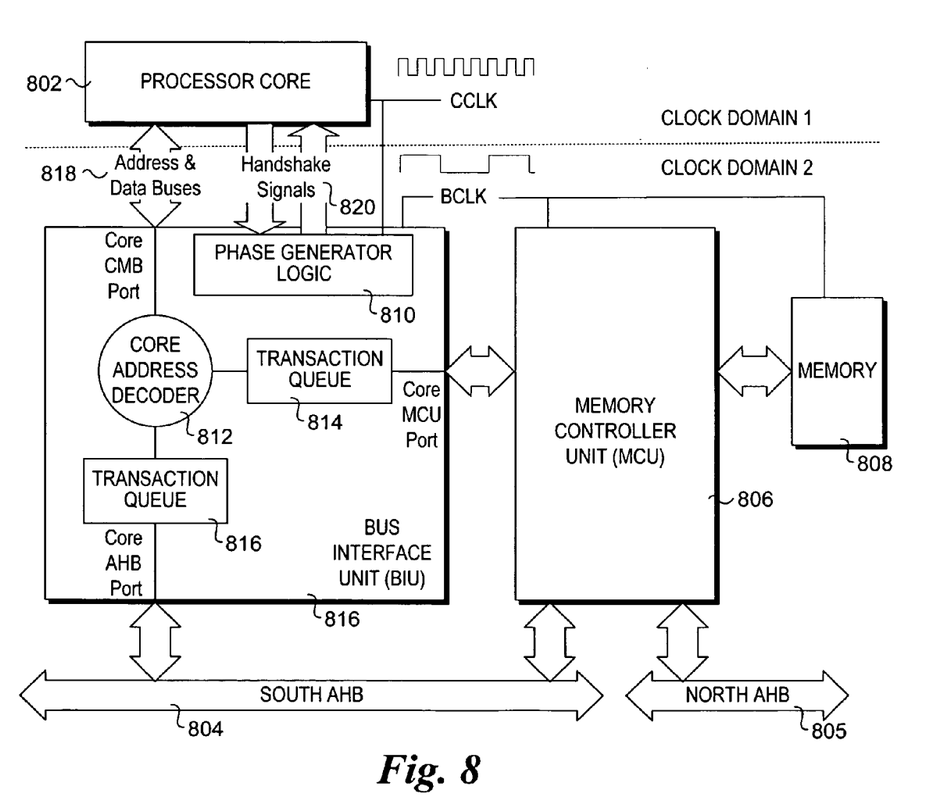
FIG. 8 is a schematic diagram of an cross-clock domain environment employing a bus interface unit with phase generator logic to facilitate communication between a processor core operating in a first clock domain and multiple components accessed via the bus interface unit operating in a second clock domain.

FIG. 8 shows an exemplary implementation of a gasket unit comprising a bus interface unit (BIU) 800. The BIU is disposed between a processor core 802, a south AHB 804 and memory controller unit (MCU) 806. MCU 806 is used to access memory 808, and also is coupled to south AHB 804 and north AHB 805. Processor core 802 operations in a clock domain 1 that employs a CCLK clock signal, while each of BIU 800, MCU 806, memory 808, south advanced high-performance bus (AHB) 804, and north AHB 805 operated in a clock domain 2 that employs a BCLK clock signal. As before, the ratio of BCLK:CCLK is a rational number.

BIU 800 employs phase generator logic 810, a core address decoder 812, and transaction queues 814 and 816. Data is passed between processor core 802 and BIU 800 via address and data buses 818 and a core memory bus (CMB) port. Handshaking signals 820, which comprise the timing signals for controlling address and data buses 818 are generated by phase generator logic 810 in accordance with an appropriate phase generation scheme corresponding to the rational number ratio of BCLK:CCLK.

As discussed above, under some configurations, handshaking signals are transmitted between communicating components in different clocking domains to control the timing of the applicable data and address buses to support communication between such components. In other configurations, these signals are referred to a control signals, since they are actually not transferred between the communicating components. In general, each of these handshaking signals and control signals comprise "clocking" signals that support communication across different clock domains by providing appropriate timing inputs to the applicable communication interface (e.g., data and address buses).

In BIU 800 transaction queues 814 and 816 function as data buffers. This enables processor core to send data to and receive data from memory 808 as well as various components accessed via south AHB 804 and north AHB 805 in an asynchronous manner. In an optional configuration (not shown), data transfers between the components in the clock domains are synchronous, and data buffers are not employed.

It is noted that the principles and teachings disclosed herein may be applied to various types of integrated circuit architectures. Generally, aspects of the techniques may be applied to architectures in which multiple clock domains having rational clock frequency ratios are employed. In some implementations involving three or more different clock domains, it is anticipated that multiple gasket units of the types described above may be employed.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method to support cross-communication between components in first and second clock domains having a clock frequency ratio that is a rational number, comprising:
    generating phase control signals during a plurality of primary cycles having a first number of phases; and
    generating phase control signals during an adjustment cycle having a second number of phases;
    repeating the generation of phase control signals in an overall cycle including the plurality of primary cycles and the adjustment cycle; and
    sending clocking signals between the first and second clock domains based on the phase control signals that are generated in combination with first and second clock signals respectively used for the first and second clock domains, wherein a clocking signal from the first to the second clock domain is launched at a rising edge of a cycle in the first clock domain and captured at a rising edge of a cycle in the second clock domain, the launching and capturing edges falling within a duration of a generated phase control signal.

2. The method of claim 1, wherein the ratio of the clock frequency in the first clock domain relative to the clock frequency in the second clock domain is N:D and the overall cycle includes N phases, each primary cycle comprising D phases and the adjustment cycle comprising R phases, wherein R=remainder(N/D).

3. The method of claim 1, wherein the first clock domain is operating at a core clock frequency and wherein a minimum of two core clock periods worth of setup time is employed for each clocking signal sent between the first and second clock domains.

4. The method of claim 1, wherein the generation of the phase control signals comprises:
    asserting a phase 1 control signal during a first phase of each primary and adjustment cycle;
    asserting a phase 2 control signal during a second phase of each primary and adjustment cycle; and
    generating a last phase control signal during a last phase of each primary and adjustment cycle.

5. The method of claim 1, wherein the ratio of the clock frequencies in the first and second clock domains is less than 2:1, the method further comprising:
    employing a 2:1 phase generator to generate phase control signals corresponding to the primary cycle; and
    employing a 1:1 phase generator to generate phase control signals corresponding to the adjustment cycle.

6. The method of claim 1, wherein the ratio of the clock frequencies in the first and second clock domains is less than 2:1, the method further comprising:
    employing a 1:1 phase generator to generate phase control signals corresponding to the primary cycle; and
    employing a 2:1 phase generator to generate phase control signals corresponding to the adjustment cycle.

7. An apparatus, comprising:
    phase generator logic, to generate a plurality of control signals used for synchronizing communication signals between first and second clock domains, wherein a ratio of the clock frequency in the first clock domain relative to the clock frequency in the second clock domain is a rational number, wherein synchronizing communication signals comprises launching a communication signal from the first to the second clock domain at a rising edge of a cycle in the first clock domain and capturing the communication signal at a rising edge of a cycle in the second clock domain, the launching and capturing edges falling within a duration of a generated control signal, and further wherein the rational number ratio, represented as N:D, is greater than 2:1, and the phase generator logic is implemented in a programmable phase generator that is programmable to generate control signals including N phases for an overall cycle that comprises a combination of at least one primary cycle and one adjustment cycle, each primary cycle comprising D phases and the adjustment cycle comprising R phases, wherein R=remainder(N/D).

8. The apparatus of claim 7, wherein the programmable phase generator includes:
    a multiplexer, having a plurality of inputs and an output; a programmable counter circuit, having a first input to receive a first clock signal employed by the first clock domain and having a first output coupled to the multiplexer;
    a D:1 phase generator, having first and second clock signal inputs to respectively receive the first clock signal and a second clock signal employed by the second clock domain, the D:1 phase generator further having an output coupled as a first input to the multiplexer;
    an R:1 phase generator, having first and second clock signal inputs to respectively receive the first clock signal and the second clock signal, and having an output coupled as a second input to the multiplexer.

9. The apparatus of claim 7, wherein a minimum of two core clock periods worth of setup time is employed for each clocking signal sent between the first and second clock domains.

10. The apparatus of claim 7, wherein the phase generator logic generates a phase 1 control signal, a phase 2 control signal, and a phase n control signal.

11. The apparatus of claim 7, wherein the ratio of the clock frequency in the first clock domain relative to the clock frequency in the second clock domain is less than 2:1.

12. The apparatus of claim 11, wherein the phase generator logic includes:

a 2:1 phase generator, to generate control signals corresponding to a cycle including two phases; and a 1:1 phase generator, to generate control signals corresponding to a cycle including one phase.

13. The apparatus of claim 12, wherein the phase generator logic is implemented in a programmable phase generator that is programmable to generate an overall cycle including at least two primary cycles using the 2:1 phase generator and one adjustment cycle using the 1:1 phase generator.

14. The apparatus of claim 12, wherein the phase generator logic is implemented in a programmable phase generator that is programmable to generate an overall cycle including at least two primary cycles using the 1:1 phase generator and one adjustment cycle using the 2:1 phase generator.

15. The apparatus of claim 7, further comprising:

a processor, operating in the first clock domain; and a bus, operating in the second clock domain, wherein the phase generator logic is operatively coupled to each of the processor and bus to provide timing control signals to support communication between the processor and the bus.

16. The apparatus of claim 7, further comprising:

a first processor, operating in the first clock domain; and a second processor, operating in the second clock domain, wherein the phase generator logic is operatively coupled to each of the first and second processors to provide timing control signals to support communication between the first and second processors.

17. The apparatus of claim 7, wherein the phase generator logic is implemented in a programmable phase generator including:

a multiplexer, having a plurality of inputs and an output;

a programmable counter circuit, having a first input to receive a first clock signal employed by the first clock domain and having a first output coupled to the multiplexer;

at least two phase generators, each to generate clocking signals corresponding to a respective integer clock ratio and having first and second clock signal inputs to respectively receive the first clock signal and a second clock signal employed by the second clock domain, each phase generator further having an output coupled as a respective input to the multiplexer.

18. The apparatus of claim 7, wherein the at least two phase generators include:

a 1:1 phase generator, having first and second clock signal inputs to respectively receive the first clock signal and a second clock signal employed by the second clock domain, the 1:1 phase generator further having an output coupled as a first input to the multiplexer;

a 2:1 phase generator, having first and second clock signal inputs to respectively receive the first clock signal and the second clock signal, and having an output coupled as a second input to the multiplexer;

a 3:1 phase generator, having first and second clock signal inputs to respectively receive the first clock signal and the second clock signal, and having an output coupled as a third input to the multiplexer; and a 4:1 phase generator, having first and second clock signal inputs to respectively receive the first clock signal and the second clock signal, and having an output coupled as a fourth input to the multiplexer.

* * * * *